Aug. 27, 1963    J. D. ADAIR    3,101,605

GAS METER PROVER

Filed Aug. 4, 1961

INVENTOR.
John D. Adair
BY Ralph Hammar
Attorney

United States Patent Office 3,101,605
Patented Aug. 27, 1963

3,101,605
GAS METER PROVER
John D. Adair, Oakland, Calif., assignor to American Meter Company, Incorporated, Philadelphia, Pa., a corporation of Delaware
Filed Aug. 4, 1961, Ser. No. 129,463
3 Claims. (Cl. 73—3)

In one method of testing gas meters, air from a proving bell is passed through a meter for a definite number of revolutions of the meter and the position at which the proving bell stops is a measure of the accuracy or proof of the meter registration. If the volume of air displaced by the proving bell is exactly equal to the volume indicated on the meter register, the meter proof is 100%. This invention utilizes a counter to obtain a digital presentation of the meter proof.

Figure 1:
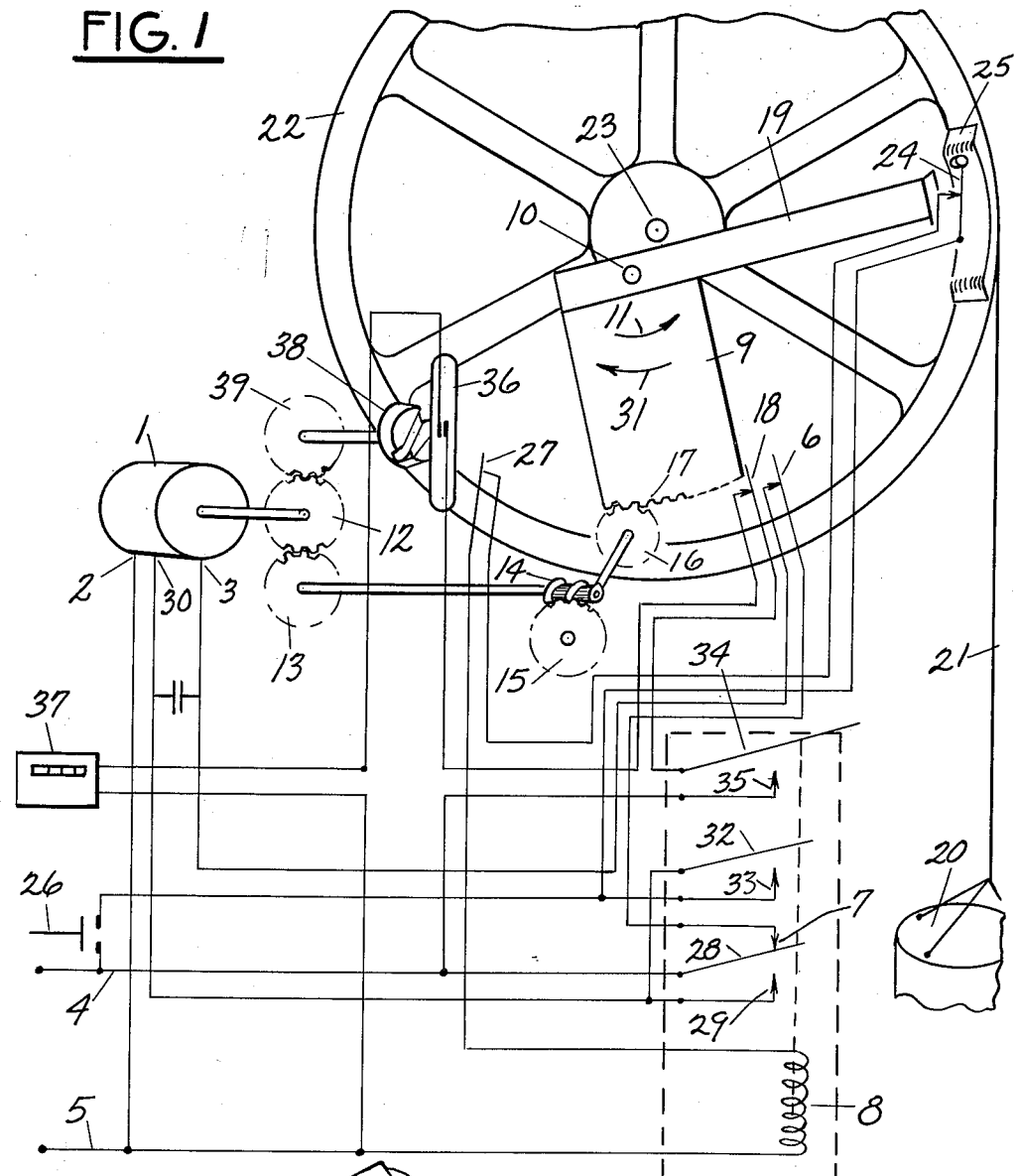
Figure 2:
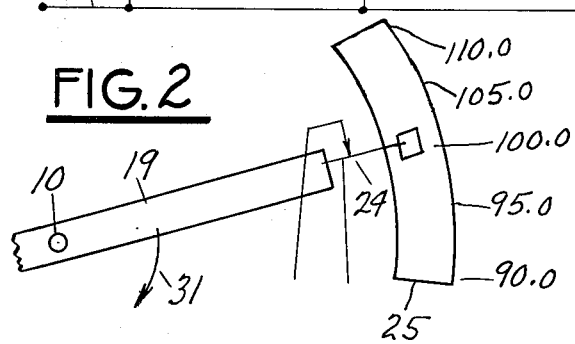

In the drawing, FIG. 1 is a system diagram and FIG. 2 shows part of the apparatus for sensing the meter proof.

In FIG. 1 the system is shown in the process of being reset, prior to starting a test run. A motor 1 has terminals 2, 3 supplied by power from line 4, 5 through switch 6 and contact 7 of relay 8. When so energized, the motor runs in a direction to turn arm 9 about pivot 10 in the counter clockwise direction of arrow 11, the drive being through gear train 12, 13, 14, 15, 16, 17. The drive continues until the arm 9 opens switch 6 and interrupts the motor circuit. Just prior to opening the switch 6, the arm 9 opens switch 18. When the motor stops, the arm 9 and an arm 19 fixed to arm 9 are turned a few degrees counter clockwise from the position illustrated in FIG. 1. This is the reset position or the position at the start of a meter test run.

The meter is tested by a proving bell 20 suspended by a chain 21 riding on the rim of a prover wheel 22 supported by axle 23. Before starting a run, the proving bell is lifted and the wheel 22 turned counter clockwise to the starting position. During the run, the proving bell drops, turning the wheel 22 clockwise and the air displaced by the bell flows through the meter. At the end of a definite number of revolutions of the meter, the proving bell is stopped and the position of the proving bell is a measure of the air which has flowed through the meter. The meter proof is the ratio of the actual volume indicated by the position of the proving bell to the registered volume indicated by the meter.

The mechanism for sensing this ratio or proof comprises a normally open switch 24 on arm 19 and a cam 25 on the prover wheel 22. As the proving wheel approaches the end of a test run, cam 25 on the wheel engages and closes switch 24 on the arm 19. The point at which this takes place is conveniently chosen as a point corresponding to 90 proof. This point could be any point below that normally encountered in the testing of meters. After the closing of switch 24, the downward movement of the proving bell 20 and the corresponding clockwise movement of the proving wheel 22 continues until the meter has made the desired number of complete revolutions. At this point the proving bell stops, for example, at the position indicated in FIG. 2 as 100. The test run on the meter is now completed and it is now desired that a digital reading be obtained of the meter proof.

To obtain a digital reading, the operator (or some automatic control) pushes start button 26 closing a circuit to relay 8 through switch 24 and limit switch 27. Operation of relay 8 moves contact 28 and closes it on contact 29, connecting motor terminals 2 and 30 across the power line 4, 5. This energizes the motor 1 to run in the direction to drive arm 9 in the clockwise direction of arrow 31, the drive being through the gear train 12–17 inclusive. Operation of the relay 8 also closes relay contact 32 on contact 33, establishing a holding circuit for the relay extending through relay contacts 28, 29, contacts 32, 33 and switches 24 and 27. Operation of the relay 8 also closes contact 34 on contact 35 establishing a circuit through switch 18 and vibrating reed switch 36 to counter 37.

The initial rotation of the motor 1 in the direction of arrow 31 moves the arm 9 away from switches 6 and 18 and allows these switches to close. The switch 6 closes first and is followed by the closing of the switch 18. Closing of switch 18 connects the vibrating reed switch 36 to the counter 37. A magnet 38 driven by the motor through gearing 12, 39 opens the switch 36 twice during each revolution of the motor. This produces two pulses per revolution which are counted by the counter 37. The rotation of the motor 1 continues until the switch 24 rides off the cam 25 at which time the switch 24 is opened, de-energizing the relay 8 and disconnecting the power from the motor and switch 36. This stops the count and the registration of counter 37 is a digital value of the proof. If the motor 1 should not stop, arm 9 opens limit switch 27. Upon opening of the circuit through the relay 8, the parts return to the position illustrated and the motor is energized at terminals 2, 3 to reset. This resetting operation does not affect the count which appears on counter 37 which remains until the counter is reset.

For the equipment illustrated, the counter 37 starts its count from 90. For the condition illustrated in FIG. 2, where the proving wheel 22 has stopped at the position corresponding to 100 proof, the switch 24 is held closed by the cam 25 until the arm 19 has turned a distance corresponding to ten points, namely the difference between 90 and 100 proof. At this point, the switch 24 runs off the cam and opens to stop the counting operation. The gear ratios are adjusted so that each pulse caused by the opening of reed switch 36 corresponds to $\tfrac{1}{10}$ of 1% proof. This means that while the arm 19 is going from the position illustrated in FIG. 2 to a position in which the switch 24 opens, there will be 100 pulses generated and the counter reading at the end of the run will be 100.0. If, for example, the prover wheel at the end of the run had stopped at a position corresponding to 98.9 proof, the switch 24 would have been held closed while 89 pulses were generated by the reed switch 36 and the count appearing on counter 37 would be 98.9.

From one aspect, the arms 9, 19 and the switch 24 are a scanner and the cam 25 is a scale from which the scanner senses the relative position of the proving bell at the end of each test.

The equipment gives an automatic digital reading of the meter proof which not only eliminates the human error in reading, but also furnishes the reading in the desired numerical form.

What is claimed as new is:

1. Apparatus for obtaining a digital presentation of meter proof in a proving bell test comprising a scanning arm having a starting position, a proving wheel rotatable by the proving bell relative to said starting position, a cam mounted on said wheel and positioned thereby relative to said starting position in accordance with the position of the proving bell at the end of a test, said scanning arm riding on said cam, a switch controlled in accordance with the relative position of said scanning arm and cam, means for driving the scanning arm at the end of a test relative to the proving wheel from said starting position to one end of the cam, means for concurrently driving a pulse generator, said driving means for the scanning arm and pulse generator being controlled through said switch, and a counter for counting the pulses generated by said generator while the scanning arm is moving to said one end of the cam.

2. Apparatus for obtaining a digital presentation of meter proof in a proving bell test comprising scanning means having a starting position, a proving wheel connected to said proving bell, a cam mounted on said proving wheel and positioned relative to said starting position in accordance with the position of the proving bell at the end of a test, means for driving the scanner at the end of a test relative to the proving wheel from said starting position to one end of the cam, means for concurrently driving a pulse generator, and a counter for counting the pulses generated by said generator while the scanner is moving to said one end of the cam.

3. Apparatus for obtaining a digital presentation of meter proof in a proving bell test comprising scanning means having a starting position, a scale, means for positioning said scale relative to said starting position in accordance with the position of the proving bell at the end of a test, means for driving the scanning means at the end of a test relative to the proving wheel from said starting position to one end of the scale, means for concurrently driving a pulse generator, and a counter for counting the pulses generated by said generator while the scanning means is moving to said one end of the scale.

References Cited in the file of this patent

UNITED STATES PATENTS

| | | |
|---|---|---|
| 2,561,904 | Burch | July 24, 1951 |
| 3,021,703 | Pfrehm | Feb. 20, 1962 |